US012641696B2

(12) United States Patent
Hu et al.

(10) Patent No.: US 12,641,696 B2
(45) Date of Patent: May 26, 2026

(54) MOBILE LIGHTING DEVICE AND CONTROL METHOD THEREFOR

(71) Applicant: Shenzhen Obuy Technology Co., Ltd, Shenzhen (CN)

(72) Inventors: Min Hu, Shenzhen (CN); Le Jiang, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 156 days.

(21) Appl. No.: 18/515,710

(22) Filed: Nov. 21, 2023

(65) Prior Publication Data

US 2025/0098052 A1 Mar. 20, 2025

(30) Foreign Application Priority Data

Sep. 15, 2023 (CN) ......................... 202311197606.4

(51) Int. Cl.
*H05B 47/105* (2020.01)

(52) U.S. Cl.
CPC .................................. *H05B 47/105* (2020.01)

(58) Field of Classification Search
CPC ...... H05B 47/105; H05B 47/115; Y02B 20/40
See application file for complete search history.

(56) References Cited

U.S. PATENT DOCUMENTS

| | | | | |
|---|---|---|---|---|
| 9,980,348 | B2 * | 5/2018 | Chen | H05B 45/31 |
| 10,546,470 | B2 * | 1/2020 | Bruck | H04L 12/2818 |
| 2013/0133262 | A1 * | 5/2013 | Marchetto | H04L 12/4035 49/24 |
| 2014/0009070 | A1 * | 1/2014 | Bouffay | F21V 23/0478 315/152 |
| 2023/0204168 | A1 * | 6/2023 | Bertken | F21V 23/0492 |
| 2024/0215133 | A1 * | 6/2024 | Huang | G03B 21/14 |

* cited by examiner

*Primary Examiner* — Raymond R Chai

(74) *Attorney, Agent, or Firm* — Christensen O'Connor Johnson Kindness PLLC

(57) ABSTRACT

A mobile lighting device and control method therefor are provided. The control method includes obtaining a mode switching signal, and controlling a working state of the mobile lighting device to switch to a mode corresponding to the mode switching signal. In a case that the mode corresponding to the mode switching signal requires an obstruction detection, the control method includes detecting whether there is an obstruction in front of a light outlet of the mobile lighting device within a set time, to obtain an obstruction detection result; and controlling, according to the obstruction detection result, the working state of the mobile lighting device.

15 Claims, 5 Drawing Sheets

MOBILE LIGHTING DEVICE AND CONTROL METHOD THEREFOR

CROSS-REFERENCE TO RELATED APPLICATIONS

This application claims priority to Chinese patent application No. 202311197606.4 filed with the Chinese Patent Office on Sep. 15, 2023, entitled "CONTROL METHOD AND DEVICE FOR MOBILE LIGHTING DEVICE, ELECTRONIC DEVICE, AND STORAGE MEDIUM", the entire content of which is incorporated by reference.

TECHNICAL FIELD

The present disclosure relates to the field of mobile lighting, and in particular, to a mobile lighting device and control method therefor, a storage medium, and a computer program product.

BACKGROUND

Mobile lighting devices (such as a flashlight, a bicycle lamp, a headlamp, etc.) are lightweight and portable, making them very useful for outdoor activities, camping, or night work. A mobile lighting device typically includes several modes with different brightness levels, and the appropriate mode can be chosen according to the actual needs.

SUMMARY

In a first aspect, the present disclosure provides a control method for a mobile lighting device. The method includes: obtaining a mode switching signal, and controlling a working state of the mobile lighting device to switch to a mode corresponding to the mode switching signal; detecting, in a case that the mode corresponding to the mode switching signal requires an obstruction detection, whether there is an obstruction in front of a light outlet of the mobile lighting device within a set time, to obtain an obstruction detection result; and controlling, according to the obstruction detection result, the working state of the mobile lighting device.

In an embodiment, the method further includes: no longer detecting whether there is an obstruction in front of the light outlet of the mobile lighting device after the set time.

In an embodiment, the mobile lighting device includes a photosensitive sensor, and the detecting whether there is an obstruction in front of the light outlet includes: reading a sensing signal of the photosensitive sensor; and determining, according to the sensing signal, whether there is an obstruction in front of the light outlet.

In an embodiment, the sensing signal includes a voltage signal, and the determining, according to the sensing signal, whether there is an obstruction in front of the light outlet includes: comparing the voltage signal with a voltage threshold; determining, if the voltage signal is less than the voltage threshold, that there is no obstruction in front of the light outlet; and determining, if the voltage signal is not less than the voltage threshold, that there is an obstruction in front of the light outlet.

In an embodiment, the controlling, according to the obstruction detection result, the working state of the mobile lighting device includes: controlling, if the obstruction detection result is that there is an obstruction, the mobile lighting device to switch to a lower brightness mode; and controlling, if the obstruction detection result is that there is no obstruction, the mobile lighting device to maintain a current working state.

In an embodiment, the controlling the mobile lighting device to switch to a lower brightness mode includes: controlling the mobile lighting device to switch to a mode that does not require the obstruction detection.

In an embodiment, the mobile lighting device includes a photosensitive sensor, and the method further includes: switching, in a case that the mode of the mobile lighting device is switched, a sensitivity of the photosensitive sensor to a sensitivity corresponding to the mode.

In an embodiment, the working state of the mobile lighting device includes: an off mode, a medium brightness mode, a high brightness mode, and an extreme brightness mode; the modes that require the obstruction detection include: the high brightness mode and the extreme brightness mode; and the modes that do not require the obstruction detection include: the off mode and the medium brightness mode.

In a second aspect, the present disclosure further provides a mobile lighting device. The mobile lighting device includes a processor and a memory storing computer programs. The processor, when executing the computer programs, implements steps of the control method for a mobile lighting device according to any one of the above embodiments of the first aspect.

In a third aspect, the present disclosure further provides a non-transitory computer-readable storage medium, having computer programs stored therein. When the computer programs executed by a processor, steps of the control method for a mobile lighting device according to any one of the above embodiments of the first aspect are implemented.

In a fourth aspect, the present disclosure further provides a computer program product, including computer programs. The computer programs, when executed by a processor, implement the steps of the control method for a mobile lighting device according to any one of the above embodiments of the first aspect.

DETAILED DESCRIPTION OF THE EMBODIMENTS

In order to make the objectives, technical solutions and advantages of the present disclosure more clearly understood, the disclosure will be further described in detail with the accompanying drawings and embodiments. It should be understood that the specific embodiments described herein are only used to explain the disclosure and not to limit the disclosure.

Figure 1:
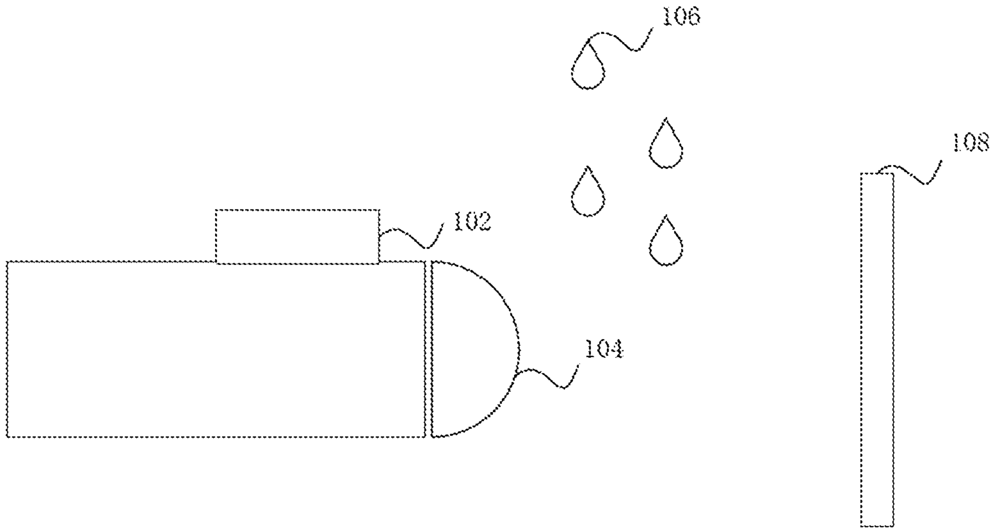
FIG. 1 is a diagram illustrating an application environment of a control method for a mobile lighting device according to an embodiment.

A control method for a mobile lighting device according to embodiments of the present disclosure may be applied to an application environment as shown in FIG. 1. During the lighting process of the mobile lighting device, a light emitted by the mobile lighting device is emitted through a light outlet 104. The mobile lighting device is provided with a button 102, and a working mode of the mobile lighting device can be switched through the button 102. Different working modes correspond to different brightness levels. However, the button of the mobile lighting device is easy to be accidentally triggered in some cases, such as when the mobile lighting device is placed in a small fabric space such as a pocket or a bag. In this case, if the modes such as an extreme brightness mode or a high brightness mode are accidentally triggered, the fabric is easily burned due to the strong light. A mobile lighting device known to the applicant is provided with a photosensitive sensor (not shown in the figure). After the button 102 is triggered, if the mobile lighting device is in a mode that requires an obstruction detection, the obstruction detection is performed through the photosensitive sensor. If an obstruction 108 is detected in front of the light outlet, the mobile lighting device is controlled to switch to a lower brightness mode.

However, this control method known to the applicant is prone to accidentally switching to a lower brightness mode. For example, in a rainy scene, when the mobile lighting device is just turned on, although there are raindrops 106 attached to the lens of the light outlet, the system will not determine that there is an obstruction because the amount of the raindrops is small. When the mobile lighting device has been used for a period of time, the amount of raindrops accumulating on the lens of the light outlet gradually increases. Based on the above control method, it will be determined that there is an obstruction in the light outlet, and the mobile lighting device will be controlled to switch to a lower brightness mode, resulting in a decrease in illumination in the rain, seriously affecting the user experience. For another example, in a close-range lighting scene, the user may need to use the high brightness mode or the extreme brightness mode for lighting to clearly observe close-range targets. However, in this case, based on the above control method, when the mobile lighting device approaches the target at a close distance, it will also be determined that there is an obstruction in the light outlet, thereby controlling the mobile lighting device to switch to a lower brightness mode, causing the user to be unable to clearly observe the close target, seriously affecting the user experience.

Based on this accidental switching to the lower brightness mode, it is found that during the actual use of the mobile lighting device, there is generally a certain time delay from the time the user turns on the required mode to the time when there is an obstruction in front of the light outlet of the mobile lighting device or when the obstruction can be detected. For example, a small amount of raindrops may not be detected as an obstruction, or the user has turned on the mobile lighting device but has not yet moved in front of the target that needs to be observed closely. Based on this, the embodiments of the present disclosure provide a control method for a mobile lighting device. After receiving a mode switching signal, an obstruction detection is only performed within a set time, and whether the mobile lighting device needs to be switched to a lower brightness mode is controlled based on an obstruction detection result. The obstruction detection will no longer be performed after the set time is ended, thereby reducing the abnormal switching to the lower brightness mode of the mobile lighting device during normal use.

Figure 2:
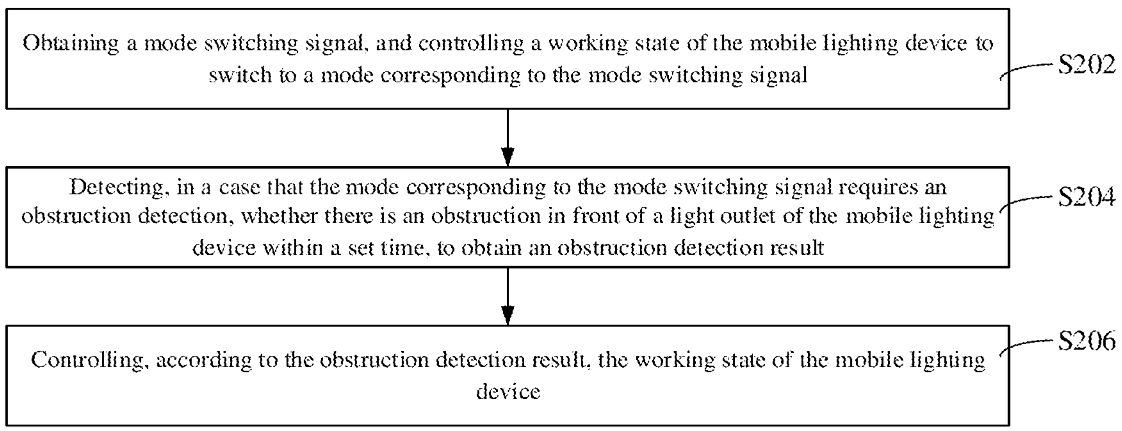
FIG. 2 is a flow chart illustrating a control method for a mobile lighting device according to an embodiment.

In an embodiment, as shown in FIG. 2, a control method for a mobile lighting device is provided. The method includes the following steps.

In step 202, a mode switching signal is obtained, and a working state of the mobile lighting device is controlled to switch to a mode corresponding to the mode switching signal.

The mode switching signal is configured to instruct the mobile lighting device to switch working modes, and the mode switching signal may be obtained in various possible ways. For example, the mode switching signal can be realized through buttons, switches, knobs, touch screens, etc., and users can easily adjust the working state of the mobile lighting device by inputting the mode switching signal, so as to adapt to different lighting needs and environmental conditions.

In an embodiment, the user inputs the mode switching signal to the mobile lighting device through a button or other input device, and the mobile lighting device obtains the mode switching signal and switches to the mode required by the user. For example, if the user selects the high brightness mode, the mobile lighting device switches the working state to the high brightness mode.

In step 204, in a case that the mode corresponding to the mode switching signal requires obstruction detection, it is detected whether there is an obstruction in front of a light outlet of the mobile lighting device within a set time to obtain an obstruction detection result.

The mode that requires the obstruction detection refers to the working modes that require high brightness output for the mobile lighting device. In these modes, the lighting device will work at a relatively high output power, which is prone to flammable risks. To avoid the risk of the obstruction being ignited, it is necessary to perform the obstruction detection.

The obstruction detection refers to determining whether there is an obstruction blocking the light in front of the light outlet of the mobile lighting device by using a sensor or other detection devices.

In some embodiments, when the mobile lighting device is in the high brightness mode or the extreme brightness mode, it is determined that the obstruction detection needs to be performed. The timer starts when the mobile lighting device switches to the high brightness mode or the extreme brightness mode, and whether there is an obstruction in front of the light outlet is detected within the set time to obtain the obstruction detection result.

In step 206, the working state of the mobile lighting device is controlled according to the obstruction detection result.

The controlling the working state of the mobile lighting device means determining the working mode or parameter configuration of the mobile lighting device according to the obstruction detection result, which is reflected in changing or maintaining the current mode.

In some embodiments, according to the obstruction detection result, the mobile lighting device can automatically adjust the brightness modes to adapt to changes in the lighting environment and achieve automated lighting control.

In the above control method for a mobile lighting device, the mobile lighting device only performs the obstruction detection within the set time. When the mobile lighting device is in the mode that requires the obstruction detection, if no obstruction is detected within the set time, the current working state of the device is maintained without switching to a lower brightness mode, thereby reducing the abnormal switching to a lower brightness mode of the mobile lighting device during normal use.

In some embodiments, according to the method of the above embodiment, the method may further include: no longer detecting whether there is an obstruction in front of the light outlet of the mobile lighting device after the set time.

Figure 3:
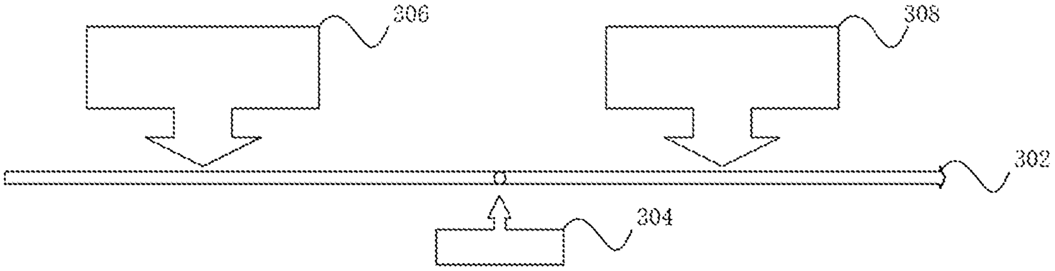
FIG. 3 is a time flow chart illustrating a control method for a mobile lighting device according to an embodiment.

The set time refers to a preset time period in the system or device, configured to control or trigger a specific time. The set time may be determined through a user configuration, a program programming or a system default value. Referring to FIG. 3, on the time axis 302, the leftmost end of the time axis 302 is defined as a starting point of time, and the direction of the arrow indicates a direction of passage of time. There is a set time 304 on the time axis 302. The time period 306 to the left of the set time represents within the set time, and the time period 308 to the right of the set time represents after the set time.

In this embodiment, the set time is preset in an internal program of the mobile lighting device. A specific value of the set time may be determined according to an actual situation, for example, the specific value of the set time may be determined by a time period between switching to the mode in which the mobile lighting device requires obstruction detection and accidentally switching to a lower brightness mode. Taking using the mobile lighting device in a rainy scene as an example, raindrops may attach to the lens of the light outlet. After many tests, it was found that within 0.5 seconds after the mobile lighting device was switched to the mode that requires the obstruction detection, the amount of water droplets attached to the lens of the light outlet is very small. At this time, although there are a few water droplets, the obstruction detection result is that there is no obstruction. Therefore, the time of the obstruction detection of the mobile lighting device is set to 0.5 s, which is the set time. After the set time, the water droplets attached to the lens of the light outlet of the mobile lighting device increase. If the obstruction detection is performed at this time, the obstruction detection result may indicate that there is an obstruction, which will cause the mobile lighting device to abnormally switch to a lower brightness mode and affect the lighting effect. Therefore, in the present disclosure, it is no longer detected whether there is an obstruction in front of the light outlet of the mobile lighting device after the set time. As shown in FIG. 3, the mobile lighting device can only perform the obstruction detection during the time period 306. During the time period 308, regardless of the working mode of the mobile lighting device, the obstruction detection is no longer performed. This configuration facilitates reducing unnecessary responses, such as the abnormal switching to the lower brightness mode during the rainy scene or when observing the close object.

In some embodiments, the mobile lighting device includes a photosensitive sensor, and the detecting whether there is an obstruction in front of the light outlet includes:

reading sensing signal of the photosensitive sensor; and determining whether there is an obstruction in front of the light outlet according to the sensing signal.

The sensing signal refers to information or data obtained from the sensor or the sensing device. In this embodiment, the sensing signal refers to the signal sent by the photosensitive sensor in the mobile lighting device.

The photosensitive sensor can determine whether there is an obstruction by measuring the intensity of the light. When there is no obstruction in front of the light outlet, the light received by the photosensitive sensor comes from an ambient light. When there is an obstruction in front of the light outlet, the photosensitive sensor also receives the light reflected back by the obstruction. In the above two cases, since the sensing signals generated by the photosensitive sensor are different, they can be used as a basis for determining the obstruction detection result. The photosensitive sensor is typically small in size and has low power consumption, making it suitable for use in the mobile lighting device. Moreover, the photosensitive sensor can detect the light in real time and respond quickly, which is beneficial to improving the sensitivity of detection.

In some embodiments, the sensing signal includes a voltage signal. The determining, according to the sensing signal, whether there is an obstruction in front of the light outlet includes:

comparing the voltage signal with a voltage threshold;

determining that there is no obstruction in front of the light outlet if the voltage signal is less than the voltage threshold; and determining that there is an obstruction in front of the light outlet if the voltage signal is not less than the voltage threshold.

The voltage threshold is a set value configured to determine a value of an output voltage of the photosensitive sensor. The set value is related to the actual application environment, sensor properties, desired detection accuracy, and so on. For example, in this embodiment, the output voltage of the photosensitive sensor is detected to determine whether there is an obstruction in front of the light outlet. The range of the output voltage of different types of photosensitive sensors may be different under the same lighting conditions, so it is necessary to set an appropriate threshold according to the specifications of the specific sensor.

In this embodiment, it is determined whether there is an obstruction in front of the light outlet by detecting the value of the output voltage of the photosensitive sensor and comparing the value of the output voltage with the preset voltage threshold. Based on this determination logic, the mobile lighting device can quickly determine whether there is an obstruction in front of the light outlet, thereby achieving rapid feedback.

In some embodiments, the controlling, according to the obstruction detection result, the working state of the mobile lighting device includes:

controlling the mobile lighting device to switch to a lower brightness mode if the obstruction detection result is that there is an obstruction; and controlling the mobile lighting device to maintain the current working state if the obstruction detection result is that there is no obstruction.

Switching to a lower brightness mode refers to adjusting the current working mode of the mobile lighting device to a lower working mode, usually reducing brightness or power output.

The working state of the mobile lighting device is controlled in real time according to the obstruction detection result, so that the mobile lighting device has intelligent properties and can adjust the working state according to a change in an environment without manual intervention, improving the user experience and the convenience of the device.

In some embodiments, the controlling the mobile lighting device to switch to a lower brightness mode includes:

controlling the mobile lighting device to switch to a mode that does not require the obstruction detection.

The mode that does not require the obstruction detection refers to one or more working states of the mobile lighting device, such as an off mode or a medium brightness mode. In these working states, the mobile lighting device does not perform the obstruction detection. When the mobile lighting device is in the mode that does not require the obstruction detection, the mobile lighting device does not pay attention to the obstruction in front of the light outlet, but maintains the current working state and is not affected by the obstruction.

The mobile lighting device switches to a lower brightness mode when detecting that there is an obstruction in front of the light outlet, which means that the output power of the mobile lighting device is reduced, thereby saving energy and avoiding the risk of the obstruction being ignited due to excessive light power. In addition, the mobile lighting device being switched to the mode that does not require the obstruction detection can avoid frequent obstruction detection, thereby simplifying the operation process of the device, and improving the response time of the device.

In some embodiments, the mobile lighting device includes a photosensitive sensor, and the method further includes the following step.

In a case that the mode of the mobile lighting device is switched, a sensitivity of the photosensitive sensor is switched to a sensitivity corresponding to the current mode.

In this embodiment, the photosensitive sensor provided by the mobile lighting device is configured to detect changes in the ambient light. Moreover, in order to adapt to different working modes, the sensitivity of the photosensitive sensor will be adjusted accordingly when the working mode of the mobile lighting device is switched.

The sensitivity of the photosensitive sensor is automatically adjusted according to the working mode of the mobile lighting device, thereby ensuring that the device can obtain accurate light information in different scenes and adapt to working requirements. For example, when the mobile lighting device is in the extreme brightness mode, the light reflected by the obstruction is strong, so the sensitivity of the photosensitive sensor needs to be appropriately reduced. When the mobile lighting device is in the high brightness mode, the light reflected by the obstruction is weak, so the sensitivity of the photosensitive sensor needs to be appropriately increased.

In some embodiments, the working states of the mobile lighting device include an off mode, a medium brightness mode, a high brightness mode, and an extreme brightness mode. The modes that require the obstruction detection include the high brightness mode and the extreme brightness mode. The modes that do not require the obstruction detection include the off mode and the medium brightness mode.

In this embodiment, the mobile lighting device generally includes many modes for adjusting lighting brightness or output power to meet different lighting needs of users. In some embodiments, the mode configuration of the mobile lighting device includes the off mode, the medium brightness mode, the high brightness mode, and the extreme brightness mode. When the mobile lighting device is in the off mode or the medium brightness mode, the device does not emit light or outputs a relatively low brightness light, and the obstruction detection is not required. When the mobile lighting device is in the high brightness mode or the extreme brightness mode, the device outputs a higher or highest brightness light, and the obstruction detection is required.

Since the output light power is relatively strong in the high brightness mode and the extreme brightness mode, the obstruction detection can ensure that the mobile lighting device can switch to a lower brightness mode in time when there is an obstruction in front of the light outlet, thereby avoiding excessive energy consumption and the risk of obstruction being ignited. Since the output light power is relatively weak in the medium brightness mode and the off mode, the output light of the mobile lighting device has little impact on the environment, and the obstruction detection is not required, thereby effectively saving the processing resources of the device, and improving the operating efficiency of the device.

Figure 4:
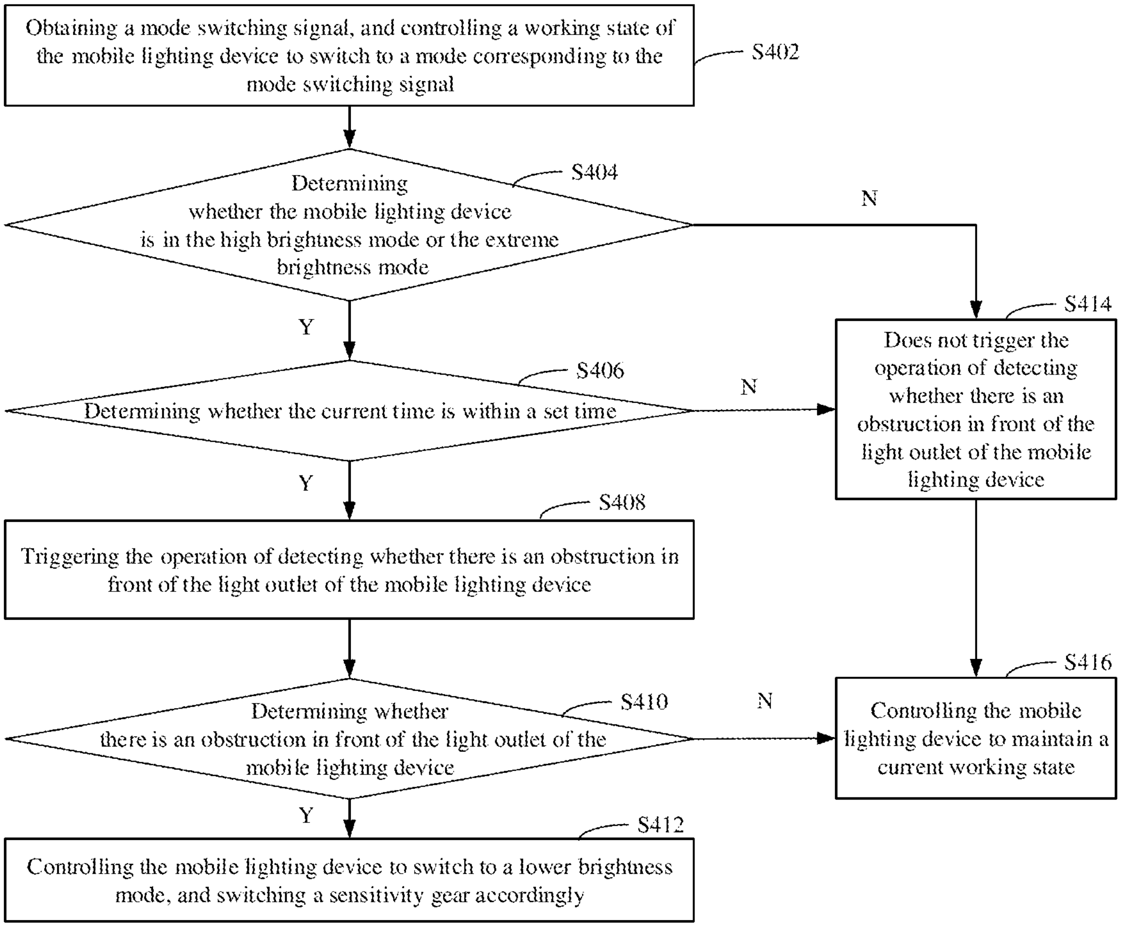
FIG. 4 is a flow chart illustrating a control method for a mobile lighting device according to another embodiment.

In some embodiments, FIG. 4 is a flow chart illustrating a control method for a mobile lighting device according to the embodiments. For example, in the case that the mobile lighting device includes four modes: the off mode, the medium brightness mode, the high brightness mode, and the extreme brightness mode, the high brightness mode and the extreme brightness mode require the obstruction detection. The control method for a mobile lighting device specifically includes the following steps.

In step 402, a mode switching signal is obtained, and a working state of the mobile lighting device is controlled to switch to a mode corresponding to the mode switching signal.

The user can select a mode that needs to be switched to through a button. The pins of a control chip of the mobile lighting device read the button signal and change the magnitude of a current by controlling a duty cycle of a width modulation of an output pulse width, thereby controlling a light-emitting mode of the mobile lighting device. Meanwhile, an internal program of the chip controls the switching of a detection sensitivity when detecting the switching of the mode. The advantage of this design is that different brightness modes correspond to different light intensities of the reflected light from the obstruction, so the most suitable detection sensitivities are also different. This design can ensure that a detection value will neither be out of range nor result in inaccurate detection due to low sensitivity.

In step 404, it is determined whether the mobile lighting device is in the high brightness mode or the extreme brightness mode. If the mobile lighting device is in the high brightness mode or the extreme brightness mode, step 406 is executed, otherwise, step 416 is executed.

The pins of the control chip of the mobile lighting device read the button signals, and the button signals and the mode signals are in one-to-one correspondence. If the button signal is the high brightness mode or the extreme brightness mode, it indicates that the mobile lighting device is in the high brightness mode or the extreme brightness mode, and step 406 is continued to be executed. If the button signal is in the off mode or the medium brightness mode, it indicates that the mobile lighting device is in the off mode or the medium brightness mode, and step 416 is executed.

In step 406, it is determined whether the current time is within a set time. The starting point of the set time is the time point of the mode switching.

The mobile lighting device includes a timing module, which starts timing instantly when switching to the high brightness mode or the extreme brightness mode. Within the set time after switching to the high brightness mode or the extreme brightness mode, step 408 is continued to be executed. After the set time after switching to the high brightness mode or the extreme brightness mode, step 414 is executed. This design can prevent the mobile lighting device from being abnormally switched to a lower brightness mode due to the system misjudging that there is an obstruction in front of the light outlet when the mobile lighting device is used on rainy days or when looking at nearby objects.

In step 408, the operation of detecting whether there is an obstruction in front of the light outlet of the mobile lighting device is triggered.

The mobile lighting device includes a detection module. The working principle of the detection is to use a photosensitive sensor to detect an intensity of the light reflected back when the mobile lighting device is blocked, so as to determine whether the device is blocked. The intensity of the reflected light received by the photosensitive sensor is different, so the sensing signals output are different. The single-chip microcomputer chip in a control device of the mobile lighting device reads the sensing signal output by the photosensitive sensor, thereby determining whether there is an obstruction in front of the light outlet.

In step 410, it is determined whether there is an obstruction in front of the light outlet of the mobile lighting device. If it is determined that there is an obstruction in front of the light outlet of the mobile lighting device, step 412 is executed. Otherwise, step 416 is executed.

The photosensitive sensor outputs different sensing signals when receiving the reflected light with different intensities, and the sensing signal includes a voltage signal.

If there is an obstruction in front of the light outlet of the mobile lighting device, the voltage value output by the photosensitive sensor is not less than a voltage threshold, and step 412 is executed. If there is no obstruction in front of the light outlet of the mobile lighting device, the voltage value output by the photosensitive sensor is less than the voltage threshold, and step 416 is executed.

In step 412, the mobile lighting device is controlled to switch to a lower brightness mode, and a sensitivity mode is switched accordingly.

When there is an obstruction in front of the light outlet of the mobile lighting device, the mobile lighting device is switched to the medium brightness mode, and the sensitivity of the photosensitive sensor is changed at the same time. For example, when the mobile lighting device is accidentally switched to the high brightness mode or the extreme brightness mode in a small fabric space such as a pocket or a bag, the mobile lighting device will switch to the medium brightness mode to prevent the fabric from being ignited due to a strong light. Because the intensities of light reflected by the obstruction corresponding to the high brightness mode and the extreme brightness mode are different, the optimal sensitivities of the photosensitive sensor are also different. By controlling the sensitivity of the photosensitive sensor to correspond to the mode of the mobile lighting device, it can be ensured that in any mode of the flashlight, the detection value of the photosensitive sensor will neither be out of range nor result in inaccurate detection due to low sensitivity.

In step 414, the operation of detecting whether there is an obstruction in front of the light outlet of the mobile lighting device is not triggered.

In step 416, the mobile lighting device is controlled to maintain the current working state.

When the mobile lighting device is not in the high brightness mode or the extreme brightness mode and the timing time from the mode was switched has exceeded the set time, the mobile lighting device maintains the current mode and does not switch to a lower brightness mode. For example, when the mobile lighting device is accidentally triggered to the medium brightness mode in the fabric space such as a pocket or a bag, there is no need to switch to a lower brightness mode since the intensity of the light is not enough to cause the obstruction to be ignited. When the mobile lighting device is switched to the high brightness mode or the extreme brightness mode on a rainy day, the water droplets on the lens of the light outlet are not enough to be determined as the obstruction within the set time, and the mobile lighting device no longer detects whether there is an obstruction in front of the light outlet after the set time, so the abnormal switching to a lower brightness mode will not occur. When the mobile lighting device is switched to the high brightness mode or the extreme brightness mode for observing nearby objects, in conjunction with the user's general usage habit of moving the mobile lighting device closer to the object after the set time, the operation of detecting whether there is an obstruction in front of the light outlet will not be triggered at this time, so there will be no abnormal switching to a lower brightness mode.

It should be understood that although the individual steps in the flow diagrams involved of the embodiments as described above are shown sequentially as indicated by arrows, the steps are not necessarily performed sequentially in the order indicated by the arrows. Unless explicitly stated herein, the execution of these steps is not strictly limited in order and these steps can be performed in any other order. Moreover, at least some of the steps in the flow diagrams involved of the embodiments as described above may include a plurality of steps or a plurality of stages that are not necessarily performed at the same time, but may be performed at different times. The order in which these steps or stages are performed is not necessarily sequential, and these steps may be performed alternately or alternately with other steps or at least some of the steps or stages in other steps.

Based on the same inventive concept, embodiments of the present disclosure also provide a control device for a mobile lighting device for implementing the control method for a mobile lighting device as described above. The solution to the problem provided by the device is similar to the implementation of the method documented above, so the specific features in the one or more embodiments of the control device for a mobile lighting device provided below may be understood with reference to the features of the control method for a mobile lighting device above, and will not be repeated here.

Figure 5:
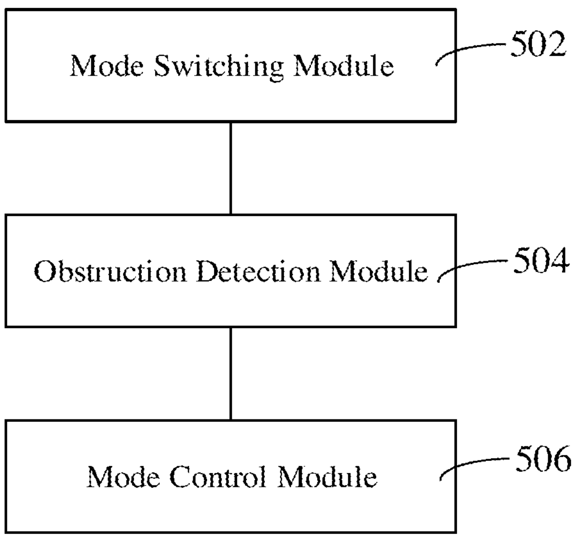
FIG. 5 is a block diagram illustrating a configuration of a control device for a mobile lighting device according to an embodiment.

In some embodiments, as shown in FIG. 5, a control device for a mobile lighting device is provided. The control device includes a mode switching module 502, an obstruction detection module 504, and a mode control module 506.

The mode switching module 502 is configured to obtain a mode switching signal, and control a working state of the mobile lighting device to switch to a mode corresponding to the mode switching signal.

The obstruction detection module 504 is configured to detect, in a case that the mode corresponding to the mode switching signal requires an obstruction detection, whether there is an obstruction in front of a light outlet of the mobile lighting device within a set time, to obtain an obstruction detection result.

The mode control module 506 is configured to control, according to the obstruction detection result, the working state of the mobile lighting device.

In some embodiments, the obstruction detection module 504 is further configured to no longer detect whether there is an obstruction in front of the light outlet of the mobile lighting device after the set time.

In some embodiments, the mobile lighting device includes a photosensitive sensor. The obstruction detection module 504 is further configured to read a sensing signal of the photosensitive sensor, and determine, according to the sensing signal, whether there is an obstruction in front of the light outlet.

In some embodiments, the sensing signal includes a voltage signal. The obstruction detection module 504 is further configured to compare the voltage signal with a voltage threshold. If the voltage signal is less than the voltage threshold, it is determined that there is no obstruction in front of the light outlet. If the voltage signal is not less than the voltage threshold, it is determined that there is an obstruction in front of the light outlet.

In some embodiments, the mode control module 506 is further configured to control, if the obstruction detection result is that there is an obstruction, the mobile lighting device to switch to a lower brightness mode, and control, if the obstruction detection result is that there is no obstruction, the mobile lighting device to maintain the current working state.

In some embodiments, the mode control module 506 is further configured to control the mobile lighting device to switch to a mode that does not require the obstruction detection.

In some embodiments, the mobile lighting device includes a photosensitive sensor. The mode control module 506 is further configured to switch, in a case that the mode of the mobile lighting device is switched, a sensitivity of the photosensitive sensor to a sensitivity corresponding to the current mode.

In some embodiments, the working states of the mobile lighting device include an off mode, a medium brightness mode, a high brightness mode, and an extreme brightness mode. The modes that require the obstruction detection include the high brightness mode and the extreme brightness mode. The modes that do not require the obstruction detection include the off mode and the medium brightness mode.

The individual modules in the above control device for a mobile lighting device can be implemented in whole or in part by software, hardware, and combinations thereof. Each of the above modules may be embedded in hardware form or independent of a processor in an electronic device, or may be stored in software form in a memory in the electronic device to facilitate calling by the processor to perform the operations corresponding to each of the above modules.

Figure 6:
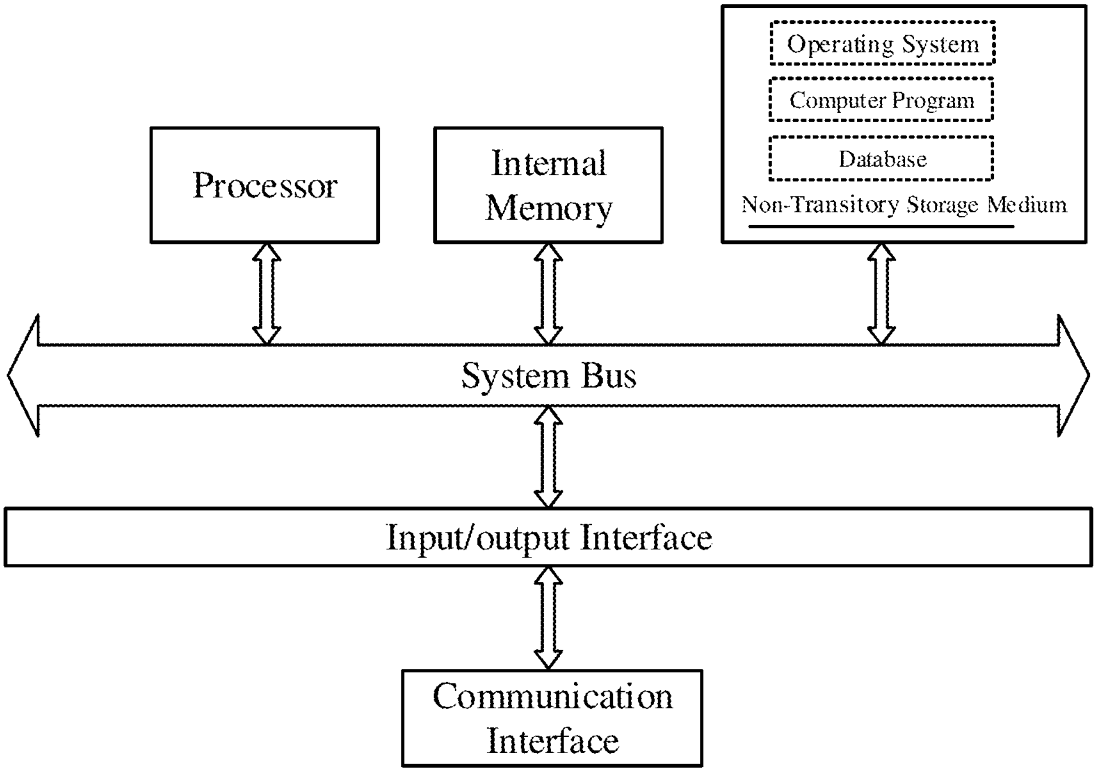
FIG. 6 is a diagram illustrating an internal configuration of an electronic device according to an embodiment.

In some embodiments, an electronic device is provided. An internal configuration of the electronic device is shown in FIG. 6. The electronic device includes a processor, a memory, and a network interface connected via a system bus. The processor of the electronic device is configured to provide computing and control capabilities. The memory of the electronic device includes a non-transitory storage medium and an internal memory. The non-transitory storage medium stores operating systems, computer programs, and databases. The internal memory provides an environment for the operation of the operating systems and the computer programs in the non-transitory storage medium. The database of the electronic device is configured to store data. The network interface of the electronic device is configured to communicate with an external terminal through a network connection. The computer programs are executed by the processor in order to implement the control method for a mobile lighting device.

It should be understood by those skilled in the art that the configuration illustrated in FIG. 6 is only a block diagram of part of the configuration related to the solution of the present disclosure, and does not constitute a limitation on the electronic device to which the solution of the present disclosure is applied. The specific electronic device may include more or less components than those shown in the figure, or may combine some components, or may have a different arrangement of components.

In some embodiments, a mobile lighting device is provided. The mobile lighting device includes a processor and a memory storing computer programs. The processor, when executing the computer programs, implements the following steps.

A mode switching signal is obtained, and a working state of the mobile lighting device is controlled to switch to a mode corresponding to the mode switching signal.

In a case that the mode corresponding to the mode switching signal requires an obstruction detection, it detects whether there is an obstruction in front of a light outlet of the mobile lighting device within a set time and obtains an obstruction detection result.

The working state of the mobile lighting device is controlled according to the obstruction detection result.

In an embodiment, the processor, when executing the computer programs, further implements the following steps.

It is no longer detected whether there is an obstruction in front of the light outlet of the mobile lighting device after the set time.

In an embodiment, the mobile lighting device includes a photosensitive sensor. The processor, when executing the computer programs, further implements the following steps.

A sensing signal of the photosensitive sensor is read.

It is determined whether there is an obstruction in front of the light outlet according to the sensing signal.

In an embodiment, the sensing signal includes a voltage signal. The processor, when executing the computer programs, further implements the following steps.

The voltage signal is compared with a voltage threshold.

If the voltage signal is less than the voltage threshold, it is determined that there is no obstruction in front of the light outlet.

If the voltage signal is not less than the voltage threshold, it is determined that there is an obstruction in front of the light outlet.

In an embodiment, the processor, when executing the computer programs, further implements the following steps.

If the obstruction detection result is that there is an obstruction, the mobile lighting device is controlled to switch to a lower brightness mode.

If the obstruction detection result is that there is no obstruction, the mobile lighting device is controlled to maintain the current working state.

In an embodiment, the processor, when executing the computer programs, further implements the following steps.

The mobile lighting device is controlled to switch to a mode that does not require the obstruction detection.

In an embodiment, the mobile lighting device includes a photosensitive sensor. The processor, when executing the computer programs, further implements the following steps.

In a case that the mode of the mobile lighting device is switched, a sensitivity of the photosensitive sensor is switched to a sensitivity corresponding to the current mode.

In an embodiment, the working state of the mobile lighting device includes an off mode, a medium brightness mode, a high brightness mode, and an extreme brightness mode. The modes that require the obstruction detection include the high brightness mode and the extreme brightness mode. The modes that do not require the obstruction detection include the off mode and the medium brightness mode.

In an embodiment, a non-transitory computer-readable storage medium is provided, in which computer programs are stored. The computer programs, when executed by a processor, implement the following steps.

A mode switching signal is obtained, and a working state of the mobile lighting device is controlled to switch to a mode corresponding to the mode switching signal.

In a case that the mode corresponding to the mode switching signal requires an obstruction detection, it detects whether there is an obstruction in front of a light outlet of the mobile lighting device within a set time and obtains an obstruction detection result.

The working state of the mobile lighting device is controlled according to the obstruction detection result.

In an embodiment, the computer programs, when executed by the processor, further implement the following steps.

It is no longer detected whether there is an obstruction in front of the light outlet of the mobile lighting device after the set time.

In an embodiment, the mobile lighting device is provided with a photosensitive sensor. The computer programs, when executed by the processor, further implement the following steps.

A sensing signal of the photosensitive sensor is read.

It is determined whether there is an obstruction in front of the light outlet according to the sensing signal.

In an embodiment, the sensing signal includes a voltage signal. The computer programs, when executed by the processor, further implement the following steps.

The voltage signal is compared with a voltage threshold.

If the voltage signal is less than the voltage threshold, it is determined that there is no obstruction in front of the light outlet.

If the voltage signal is not less than the voltage threshold, it is determined that there is an obstruction in front of the light outlet.

In an embodiment, the computer programs, when executed by the processor, further implement the following steps.

If the obstruction detection result is that there is an obstruction, the mobile lighting device is controlled to switch to a lower brightness mode.

If the obstruction detection result is that there is no obstruction, the mobile lighting device is controlled to maintain the current working state.

In an embodiment, the computer programs, when executed by the processor, further implement the following steps.

The mobile lighting device is controlled to switch to a mode that does not require the obstruction detection.

In an embodiment, the mobile lighting device is provided with a photosensitive sensor. The computer programs, when executed by the processor, further implement the following steps.

In a case that the mode of the mobile lighting device is switched, a sensitivity of the photosensitive sensor is switched to a sensitivity corresponding to the mode.

In an embodiment, the working state of the mobile lighting device includes an off mode, a medium brightness mode, a high brightness mode, and an extreme brightness mode. The modes that require the obstruction detection include the high brightness mode and the extreme brightness mode. The modes that do not require the obstruction detection include the off mode and the medium brightness mode.

In an embodiment, a computer program product is provided, including computer programs. The computer programs, when executed by a processor, implement the following steps.

A mode switching signal is obtained, and a working state of the mobile lighting device is controlled to switch to a mode corresponding to the mode switching signal.

In a case that the mode corresponding to the mode switching signal requires an obstruction detection, it detects whether there is an obstruction in front of a light outlet of the mobile lighting device within a set time and obtains an obstruction detection result.

The working state of the mobile lighting device is controlled according to the obstruction detection result.

In an embodiment, the computer programs, when executed by the processor, further implement the following steps.

It is no longer detected that whether there is an obstruction in front of the light outlet of the mobile lighting device after the set time.

In an embodiment, the mobile lighting device is provided with a photosensitive sensor. The computer programs, when executed by the processor, further implement the following steps.

A sensing signal of the photosensitive sensor is read.

It is determined whether there is an obstruction in front of the light outlet according to the sensing signal.

In an embodiment, the sensing signal includes a voltage signal. The computer programs, when executed by the processor, further implement the following steps.

The voltage signal is compared with a voltage threshold.

If the voltage signal is less than the voltage threshold, it is determined that there is no obstruction in front of the light outlet.

If the voltage signal is not less than the voltage threshold, it is determined that there is an obstruction in front of the light outlet.

In an embodiment, the computer programs, when executed by the processor, further implement the following steps.

If the obstruction detection result is that there is an obstruction, the mobile lighting device is controlled to switch to a lower brightness mode.

If the obstruction detection result is that there is no obstruction, the mobile lighting device is controlled to maintain the current working state.

In an embodiment, the computer programs, when executed by the processor, further implement the following steps.

The mobile lighting device is controlled to switch to a mode that does not require the obstruction detection.

In an embodiment, the mobile lighting device includes a photosensitive sensor. The computer programs, when executed by the processor, further implement the following steps.

In a case that the mode of the mobile lighting device is switched, a sensitivity of the photosensitive sensor is switched to a sensitivity corresponding to the current mode.

In an embodiment, the working states of the mobile lighting device includes an off mode, a medium brightness mode, a high brightness mode, and an extreme brightness mode. The modes that require the obstruction detection include the high brightness mode and the extreme brightness mode. The modes that do not require the obstruction detection include the off mode and the medium brightness mode.

It should be noted that the user information (including but not limited to user device information, user personal information, etc.) and data (including but not limited to data used for analysis, stored data, displayed data, etc.) involved in the present disclosure are information and data authorized by the user or fully authorized by all parties.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes of the embodiments of the above methods. Any reference to memory, database or other medium used of the embodiments provided in the present disclosure may include at least one of a non-transitory and a transitory memory. The non-transitory memory may include a read-only memory (ROM), a magnetic tape, a floppy disk, a flash memory, an optical memory, a high-density embedded non-transitory memory, a resistive random-access memory (ReRAM), a magnetoresistive random access memory (MRAM), a ferroelectric random-access memory (FRAM), a phase change memory (PCM), or a graphene memory, etc. The transitory memory may include a random-access memory (RAM) or an external cache memory, etc. As an illustration rather than a limitation, the random-access memory may be in various forms, such as a static random-access memory (SRAM) or a dynamic random-access memory (DRAM), etc. The databases involved of the embodiments provided by the present disclosure may include at least one of a relational database and a non-relational database. The non-relational database may include, but is not limited to, a blockchain-based distributed database, etc. The processor involved of the embodiments provided by the present disclosure may be, but is not limited to, a general purpose processor, a central processor, a graphics processor, a digital signal processor, a programmable logic device, a data processing logic device based on quantum computation, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present disclosure, and their description is specific and detailed, but should not be understood as a limitation on the patent scope of the present disclosure. It should be noted that, for a person of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. A control method for a mobile lighting device, the method comprising:

obtaining a mode switching signal, and controlling a working state of the mobile lighting device to switch to a mode corresponding to the mode switching signal;

detecting, in a case that the mode corresponding to the mode switching signal requires an obstruction detection, whether there is an obstruction in front of a light outlet of the mobile lighting device only within a set time, to obtain an obstruction detection result, and no longer detecting whether there is the obstruction in front of the light outlet of the mobile lighting device after the set time to prevent the mobile lighting device from being abnormally switched to a lower brightness mode due to misjudging that the obstruction is in front of the light outlet, wherein a starting point of the set time is a moment when the mobile lighting device is switched to the mode that requires obstacle detection; and controlling, according to the obstruction detection result, the working state of the mobile lighting device.

2. The method of claim 1, wherein the mobile lighting device comprises a photosensitive sensor, and the detecting whether there is the obstruction in front of the light outlet comprises:

reading a sensing signal of the photosensitive sensor; and determining, according to the sensing signal, whether there is the obstruction in front of the light outlet.

3. The method of claim 2, wherein the sensing signal comprises a voltage signal, and the determining, according to the sensing signal, whether there is the obstruction in front of the light outlet comprises:

comparing the voltage signal with a voltage threshold;

determining, when the voltage signal is less than the voltage threshold, that there is no obstruction in front of the light outlet; and determining, when the voltage signal is greater than or equal to the voltage threshold, that there is the obstruction in front of the light outlet.

4. The method of claim 1, wherein the controlling, according to the obstruction detection result, the working state of the mobile lighting device comprises:

controlling, when the obstruction detection result is that there is the obstruction, the mobile lighting device to switch to a lower brightness mode; and controlling, when the obstruction detection result is that there is no obstruction, the mobile lighting device to maintain a current working state.

5. The method of claim 4, wherein the controlling the mobile lighting device to switch to the lower brightness mode comprises:

controlling the mobile lighting device to switch to a mode that does not require the obstruction detection.

6. The method of claim 1, wherein the mobile lighting device comprises a photosensitive sensor, and the method further comprises:

switching, in a case that the mode of the mobile lighting device is switched, a sensitivity of the photosensitive sensor to a sensitivity corresponding to the mode.

7. The method of claim 1, wherein:

the working state of the mobile lighting device comprises: an off mode, a medium brightness mode, a high brightness mode, and an extreme brightness mode;

the modes that require the obstruction detection comprise: the high brightness mode and the extreme brightness mode; and the modes that do not require the obstruction detection comprise: the off mode and the medium brightness mode.

8. A non-transitory computer-readable storage medium, having computer programs stored therein, wherein the computer programs, when executed by a processor, implement steps of the method of claim 1.

9. A mobile lighting device comprising a processor and a memory storing computer programs, wherein the processor, when executing the computer programs, implements a control method for the mobile lighting device, wherein the method comprises:

obtaining a mode switching signal, and controlling a working state of the mobile lighting device to switch to a mode corresponding to the mode switching signal;

detecting, in a case that the mode corresponding to the mode switching signal requires an obstruction detection, whether there is an obstruction in front of a light outlet of the mobile lighting device only within a set time, to obtain an obstruction detection result, and no longer detecting whether there is the obstruction in front of the light outlet of the mobile lighting device after the set time to prevent the mobile lighting device from being abnormally switched to a lower brightness mode due to misjudging that the obstruction is in front of the light outlet, wherein a starting point of the set time is a moment when the mobile lighting device is switched to the mode that requires obstacle detection; and controlling, according to the obstruction detection result, the working state of the mobile lighting device.

10. The mobile lighting device of claim 9, further comprising a photosensitive sensor, wherein the detecting whether there is the obstruction in front of the light outlet of the mobile lighting device within the set time comprises:

reading a sensing signal of the photosensitive sensor; and determining, according to the sensing signal, whether there is the obstruction in front of the light outlet.

11. The mobile lighting device of claim 10, wherein the sensing signal comprises a voltage signal, and the determining, according to the sensing signal, whether there is the obstruction in front of the light outlet comprises:

comparing the voltage signal with a voltage threshold;

determining, when the voltage signal is less than the voltage threshold, that there is no obstruction in front of the light outlet; and determining, when the voltage signal is greater than or equal to the voltage threshold, that there is the obstruction in front of the light outlet.

12. The mobile lighting device of claim 9, wherein the controlling, according to the obstruction detection result, the working state of the mobile lighting device comprises:

controlling, when the obstruction detection result is that there is the obstruction, the mobile lighting device to switch to a lower brightness mode; and controlling, when the obstruction detection result is that there is no obstruction, the mobile lighting device to maintain a current working state.

13. The mobile lighting device of claim 12, wherein the controlling the mobile lighting device to switch to the lower brightness mode comprises:

controlling the mobile lighting device to switch to a mode that does not require the obstruction detection.

14. The mobile lighting device of claim 9, further comprising a photosensitive sensor, wherein the method further comprises:

switching, in a case that the mode of the mobile lighting device is switched, a sensitivity of the photosensitive sensor to a sensitivity corresponding to the mode.

15. The mobile lighting device of claim 9, wherein the working state of the mobile lighting device comprises an off mode, a medium brightness mode, a high brightness mode, and an extreme brightness mode;

the modes that require the obstruction detection comprise: the high brightness mode and the extreme brightness mode; and the modes that do not require the obstruction detection comprise: the off mode and the medium brightness mode.

* * * * *